United States Patent
Sakai et al.

(10) Patent No.: US 9,317,028 B2
(45) Date of Patent: Apr. 19, 2016

(54) ELECTRIC MOTOR CONTROL DEVICE

(71) Applicant: OKUMA Corporation, Niwa-gun, Aichi (JP)

(72) Inventors: Takeshi Sakai, Niwa-gun (JP); Akiyoshi Satake, Niwa-gun (JP)

(73) Assignee: OKUMA CORPORATION (JP)

( * ) Notice: Subject to any disclaimer, the term of this patent is extended or adjusted under 35 U.S.C. 154(b) by 40 days.

(21) Appl. No.: 14/251,176

(22) Filed: Apr. 11, 2014

(65) Prior Publication Data

US 2014/0306644 A1 Oct. 16, 2014

(30) Foreign Application Priority Data

Apr. 12, 2013 (JP) ................. 2013-083697

(51) Int. Cl.
 *G05B 11/32* (2006.01)
 *G05B 19/404* (2006.01)
(52) U.S. Cl.
 CPC .... *G05B 19/404* (2013.01); *G05B 2219/37297* (2013.01); *G05B 2219/41034* (2013.01); *G05B 2219/41264* (2013.01); *G05B 2219/41265* (2013.01); *G05B 2219/41395* (2013.01)
(58) Field of Classification Search
 CPC ..................................................... G05B 19/404
 USPC ........................................................ 318/625
 See application file for complete search history.

(56) References Cited

FOREIGN PATENT DOCUMENTS

| JP | 2003079180 A | 3/2003 |
|---|---|---|
| JP | 2010172054 A | 8/2010 |

*Primary Examiner* — Erick Glass
(74) *Attorney, Agent, or Firm* — McCarter & English, LLP

(57) ABSTRACT

An electric motor control device for performing tandem control for driving one movable component includes, for each electric motor, a position controller, a speed controller, and a current controller. Further, each electric motor also has a preload controller for adding a preload torque to a torque command Tm calculated by the speed controller, and to a torque command Ts calculated by the speed controller. The preload controller calculates a minimum necessary preload torque for eliminating backlash in accordance with a position of the movable component.

5 Claims, 5 Drawing Sheets

US 9,317,028 B2

ELECTRIC MOTOR CONTROL DEVICE

CROSS-REFERENCE TO RELATED APPLICATIONS

This application claims priority under 35 U.S.C. §119(a)-(d) to Japanese Patent Application No. 2013-083697, filed Apr. 12, 2013, the content of which is incorporated herein by reference in its entirety as part of the present disclosure.

FIELD OF THE INVENTION

The present invention relates to a control device for driving in tandem a plurality of electric motors for use in, for example, a machine tool, and in particular, relates to a control method for eliminating factors causing instability in control that come from a power transmission mechanism typically including a belt or a gear between an electric motor and a control target by performing compensation with micro torques having different polarities on torque command values that are to be applied to the electric motors. Also, the present invention relates to control for causing a current that is to be applied to an electric motor to vary in accordance with the attitude of a machine.

BACKGROUND OF THE INVENTION

When, for example, a machine tool includes a large movable component that is to be moved, and that cannot be driven by just a single motor, the same movement command is provided to a plurality of motors to perform tandem control in which the movement of the movable component on the same axis of movement is driven and controlled by a plurality of motors.

JP 2003-079180 A discloses a technique of a tandem control electric motor control device that drives one movable component using a main electric motor and an auxiliary electric motor, the tandem control electric motor control device including a torque arbitrator for performing low-pass filtering on a difference between a torque command for a main control device and a torque command for an auxiliary control device to correct the torque command for the auxiliary control device. FIG. 6 is a block diagram illustrating main components for the tandem control disclosed in JP 2003-079180 A. Referring to FIG. 6, a position controller (not shown) calculates a speed command for an electric motor based on a common position command for controlling the position of the movable component and position feedback information detected by a position detector 4.

Speed controllers 11 and 21 respectively calculate torque commands Tm and Ts by performing control such as PI control based on the speed command received from the position controller and speed feedback information detected by speed detectors 15 and 25. A torque arbitrator 40 performs low-pass filtering on a difference between the torque command Tm for a main control device and the torque command Ts for an auxiliary control device, and adds the result to the torque command for the auxiliary control device. Current controllers 12 and 22 calculate voltage commands based on the torque commands Tm and Ts and the current feedback information. The current feedback information is not described here.

Servo amplifiers 13 and 23 output driving currents for driving electric motors 14 and 24 based on the voltage commands output from the current controllers 12 and 22, and drive the electric motors 14 and 24, which move a movable component 3 through power transmission mechanisms 16 and 26.

As described above, position, speed, and current loop control for the plurality of electric motors 14 and 24 is performed based on a common position command, and the movable component is driven by a combined torque output from the electric motors 14 and 24.

JP 2010-172054 A discloses a technique of two tandem control systems, torque tandem control and position tandem control, including a corrector for applying a preload torque value to torque commands in order to minimize backlash between two motors. FIG. 7 is a block diagram illustrating main components of a structure based on the tandem control disclosed in JP 2003-079180 A, and including a corrector for applying a preload torque value disclosed in JP 2010-172054 A. Referring to FIG. 7, an amount of preload outputter 70 adds a preload torque that assumes a constant value, to the torque command Tm for the main control device, and adds the preload torque, with the polarity inverted, to the torque command Ts for the auxiliary control device.

However, the technique of applying a preload torque to two motors disclosed in JP 2010-172054 A cannot be applied to the tandem control electric motor control device having the torque arbitrator disclosed in JP 2003-079180 A because, if applied, as illustrated in FIG. 7, a torque arbitration value is generated when a preload torque is applied or removed, and displacement of the movable component occurs. The mechanics of how displacement occurs when a preload torque is applied or removed will be described below. The speed controllers 11 and 21 output torque commands Tm and Ts, each for causing an amount of speed deviation to become zero based on the speed feedback information of the speed detector 15 or 25. At this time, if the torque arbitrator 40 is ignored, because the torque commands Tm and Ts are outputs that assume the same value with different polarities, the combined torque output from the electric motors is zero, and no displacement of the movable component occurs. However, actually, because the torque arbitrator 40 causes the torque command Ts for the auxiliary electric motor to assume a value different from the torque command Tm for the main electric motor, the combined torque output from the electric motors is not zero, and displacement of the movable component occurs.

As a result, when a power transmission mechanism, such as a reduction gear or a gear, of a machine has large backlash or torsional moment, because an increase in gains of speed and position control loops oscillates electric motors and causes vibrations or unusual noise, gain should be lowered, which degrades follow-up performance. When the backlash or torsional moment of a reduction gear or a gear is structurally reduced, the rigidity of the transmission mechanism should be increased, and the gear should be of a higher accuracy (grade), which increases the costs.

In the tandem control electric motor control device having a corrector for applying a preload torque value disclosed in JP 2010-172054 A, when the shaft structure requires a holding torque under the influence of gravity, because the holding torque and the preload torque for minimizing backlash are added to a torque command, the electric motors generate greater heat. As a result, greater thermal displacement shifts the center of the shaft, resulting in deterioration in machining accuracy, or the machine is stopped in response to an overload alarm for protecting the electric motors, resulting in decreased machining efficiency.

Although the problems can be solved by water cooling the electric motors or the machine as a method for minimizing such thermal displacement caused by heat generation, this approach increases the costs. Further, although the problems can be solved by employing electric motors having greater continuous rated power as a method for minimizing heat generation of the electric motors, the increase in capacity of the electric motors increases the costs, and because the volume of the electric motors is increased, this approach upsizes the machine and reduces the design flexibility of the machine.

SUMMARY OF THE INVENTION

According to one aspect of the present invention, there is provided an electric motor control device for performing tandem control for driving one movable component for which an amount of load caused by gravity varies in accordance with a position of the movable component, using a main electric motor and an auxiliary electric motor, the electric motor control device comprising, for each of the electric motors, a position controller for calculating a speed command for a corresponding electric motor based on a common position command for controlling the position of the movable component; a speed controller for calculating a torque command for a corresponding electric motor based on the speed command calculated by the position controller; a preload controller for applying a preload torque to the torque command calculated by the speed controller, the preload torque having opposite polarities for the main electric motor and the auxiliary electric motor; and a current controller for calculating a current command for a corresponding electric motor based on the torque command, wherein the preload controller causes a preload torque that is to be applied to vary in accordance with the position of the movable component.

Further, in the electric motor control device according to the present invention, it is preferable for the preload controller to apply a value obtained by multiplying a predetermined reference torque by a coefficient that varies in accordance with the position of the movable component, as the preload torque, and for the coefficient to be constant in a constant coefficient range that is symmetric with respect to a given point of origin, and to decrease with distance from the point of origin outside the constant coefficient range. Further, in the electric motor control device according to the present invention, it is also preferable for a sum of the preload torque that is to be applied and a holding torque for holding the movable component at a command position, the holding torque varying in accordance with the position of the movable component, to be maintained constant irrespective of the position of the movable component.

According to another aspect of the present invention, there is provided an electric motor control device for performing tandem control for driving one movable component using a main electric motor and an auxiliary electric motor, the electric motor control device comprising, for each of the electric motors, a position controller for calculating a speed command for a corresponding electric motor based on a common position command for controlling a position of the movable component; a speed controller for calculating a torque command for a corresponding electric motor based on the speed command calculated by the position controller; a preload controller for applying a preload torque to the torque command calculated by the speed controller, the preload torque having opposite polarities for the main electric motor and the auxiliary electric motor; and a current controller for calculating a current command for a corresponding electric motor based on the torque command, wherein the electric motor control device further comprises a torque arbitrator for calculating a torque arbitration value for performing arbitration on a difference between the torque command calculated by the speed controller for the main electric motor and the torque command calculated by the speed controller for the auxiliary electric motor in accordance with at least time that has elapsed from application or removal of the preload torque, and adding the torque arbitration value to the torque command before the torque command is input to the current controller for the auxiliary electric motor.

Further, in the electric motor control device according to the present invention, it is preferable for the torque arbitrator to output zero as the torque arbitration value until the time that has elapsed from application or removal of the preload torque reaches a predetermined reference period of time, and to output a value obtained by performing low-pass filtering on the difference between the torque command calculated by the speed controller for the main electric motor and the torque command calculated by the speed controller for the auxiliary electric motor, as the torque arbitration value when the time that has elapsed from application or removal of the preload torque exceeds the predetermined reference period of time.

With the present invention, the tandem control electric motor control device including the torque arbitration controller and the preload controller for applying a preload torque calculates a torque arbitration value for correcting the torque command for the auxiliary electric motor in accordance with time that has elapsed from application or removal of the preload torque. As a result, it is possible to minimize displacement of a movable component caused by the preload torque.

Further, by causing the preload torque to vary in accordance with the position of the movable component, when the shaft requires a holding torque under the influence of gravity, it is possible to avoid situations in which the electric motors generate greater heat as the holding torque and the preload torque are added to the torque command, and because thermal displacement is minimized, it is possible to prevent deterioration in machining accuracy, or stopping of the machine in response to an overload alarm for protecting the electric motors.

BRIEF DESCRIPTION OF THE DRAWINGS

Preferred embodiments of the present invention will be described in detail by reference to the following figures, wherein.

DETAILED DESCRIPTION OF EMBODIMENTS OF THE INVENTION

An embodiment of the present invention will be described below with reference to the drawings. Elements, signals, or others denoted by the same reference symbols or numerals have the same function and the same performance unless specifically indicated otherwise.

Figure 1:
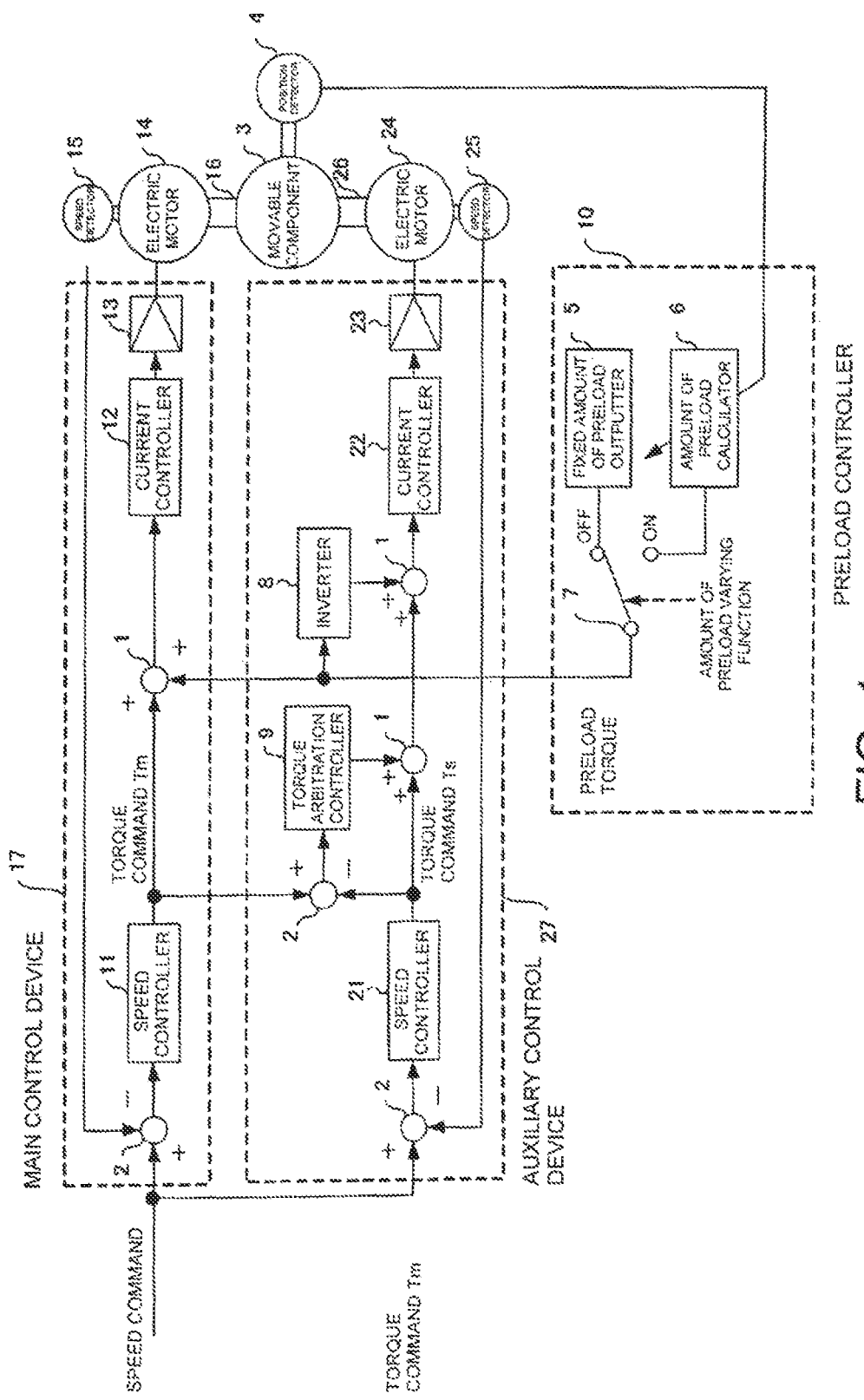
FIG. 1 is a block diagram of a control system for a tandem control electric motor control device having a torque arbitration controller and a preload controller for applying a preload torque according to an embodiment of the present invention.

FIG. 1 is a block diagram of a control system for a tandem control electric motor control device having a torque arbitration controller and a preload controller for applying a preload torque according to an embodiment of the present invention. Description of components corresponding to those of the related art is not repeated here.

Referring to FIG. 1, a preload controller 10 includes an amount of preload calculator 6 for calculating and outputting an amount of preload based on positional information detected by a position detector 4, and a fixed amount of preload outputter 5 for outputting a fixed amount of preload. The preload controller 10 has the function of determining whether an amount of preload varying function, the function of varying the amount of preload, is on or off to select a preload torque that is to be output. By turning the amount of preload varying function off when the movable component is free from the influence of gravity, and the mechanism can minimize backlash through application of a constant preload, and by turning the amount of preload varying function on when the movable component is under the influence of gravity, the preload torque can be selected in accordance with the mechanism that is to be driven. The variable value for the amount of preload varies in accordance with the position of the movable component (such as the attitude of the machine or the angle of the rotating shaft). The preload torque that has been output is added to a torque command value Tm calculated by a speed controller 11, and is added to a torque command value Ts after the polarity has been inverted through an inverter 8.

Figure 4:
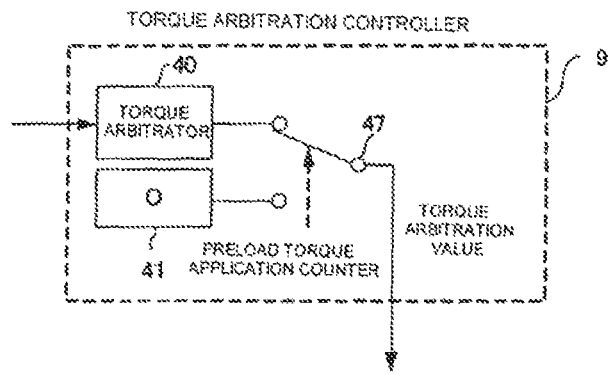
FIG. 4 is a block diagram illustrating the torque arbitration controller shown in FIG. 1.

FIG. 4 is a block diagram illustrating a torque arbitration controller 9 shown in FIG. 1. The torque arbitration controller 9 includes a torque arbitrator 40 as disclosed in JP 2003-079180 A, a zero outputter 41 for outputting zero, and a switch 47 for selecting one of outputs from the torque arbitrator 40 and from the zero outputter 41 in accordance with a preload torque application counter.

The switch 47 selects an output from the zero outputter 41 when the preload torque application counter is less than or equal to a set counter upper limit value, and selects an output from the torque arbitrator 40 when the preload torque application counter exceeds the set counter upper limit value.

The preload torque application counter starts from 0, does not increment during the time when the preload torque does not vary, starts incrementing from the time when application or removal of the preload torque is started, and stops incrementing after the preload torque application counter exceeds the set counter upper limit value. When removal or application of the preload torque is started, the counter is reset to 0. The counter upper limit value sets a period of time after application of the preload torque is started until an amount of speed deviation of the electric motor 14 or 24 converges to zero.

After application or removal of the preload, while an amount of speed deviation remains for the electric motor 14 or 24, the torque arbitration controller 9 sets a torque arbitration value to zero. The torque arbitration controller 9 adds a torque arbitration value output from the torque arbitrator 40 to a torque command for the auxiliary electric motor from the time at which the amount of speed deviation has become zero. By doing so, displacement of the movable component can be prevented.

Figure 2A:
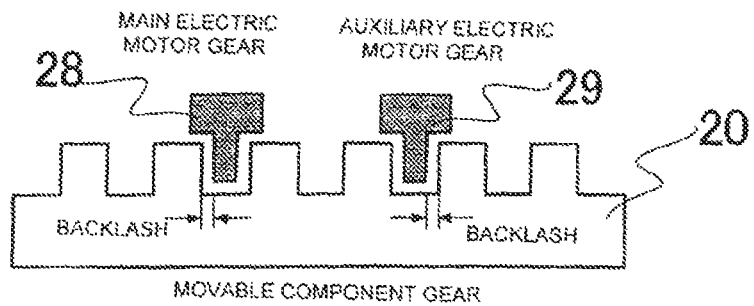
FIGS. 2A and 2B are model diagrams of a power transmission mechanism to which the present invention is applied.
Figure 2B:
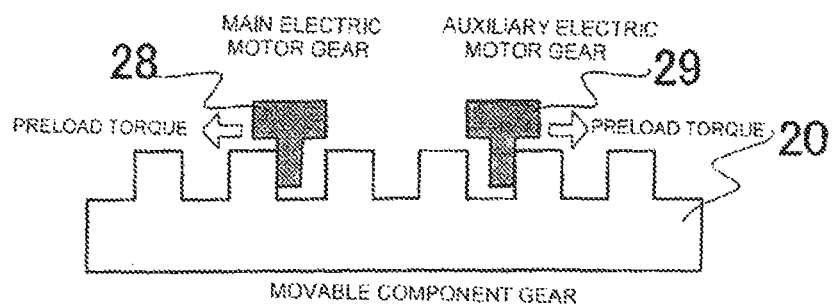
Figure 6:
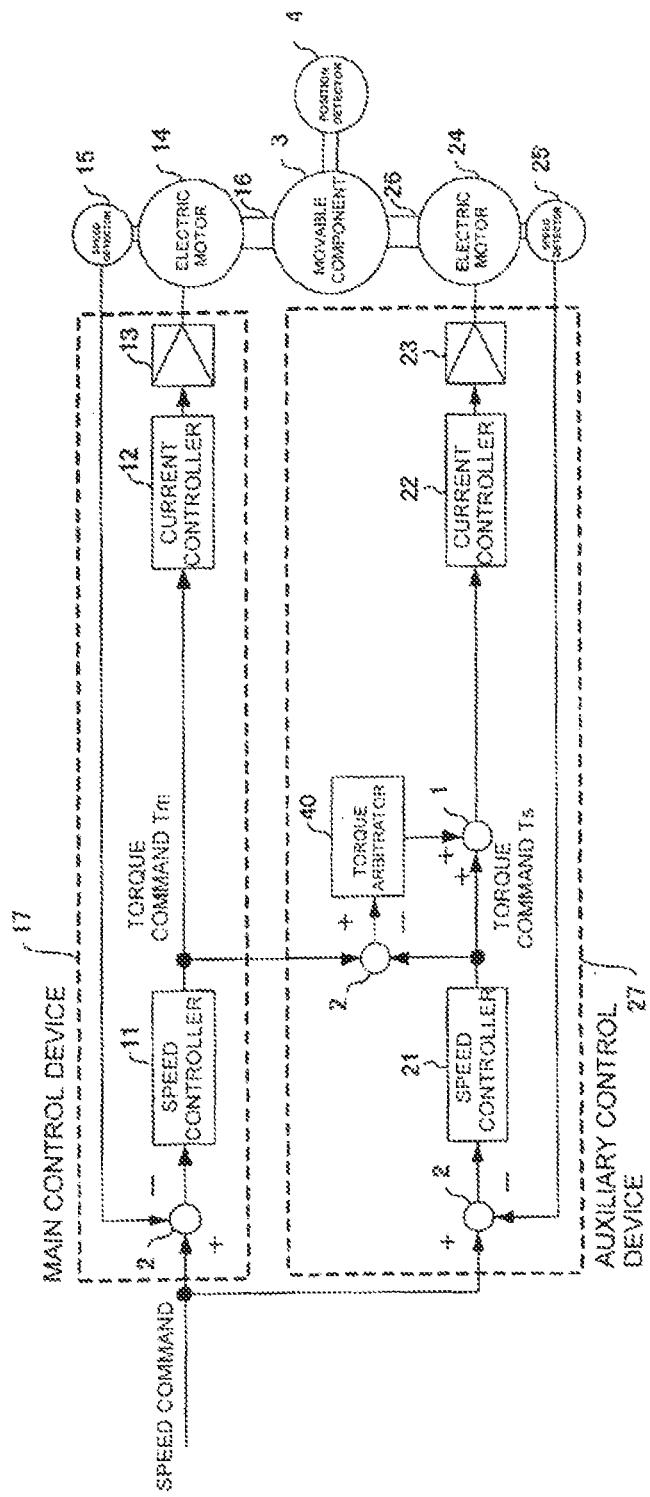
FIG. 6 is a block diagram illustrating main components for related art tandem control.

FIGS. 2A and 2B are model diagrams of a power transmission mechanism to which the present invention is applied. FIG. 2A illustrates a mechanism for transmitting power from electric motors through gears to a movable component, in which backlash is present between a movable component gear 20 and a main electric motor gear 28, and between the movable component gear 20 and an auxiliary electric motor gear 29. In such a mechanism, because the backlash causes the electric motors to oscillate to produce vibrations or unusual noise when gains of speed and position control loops are increased in the related art illustrated in FIG. 6, gains cannot be increased.

Figure 7:
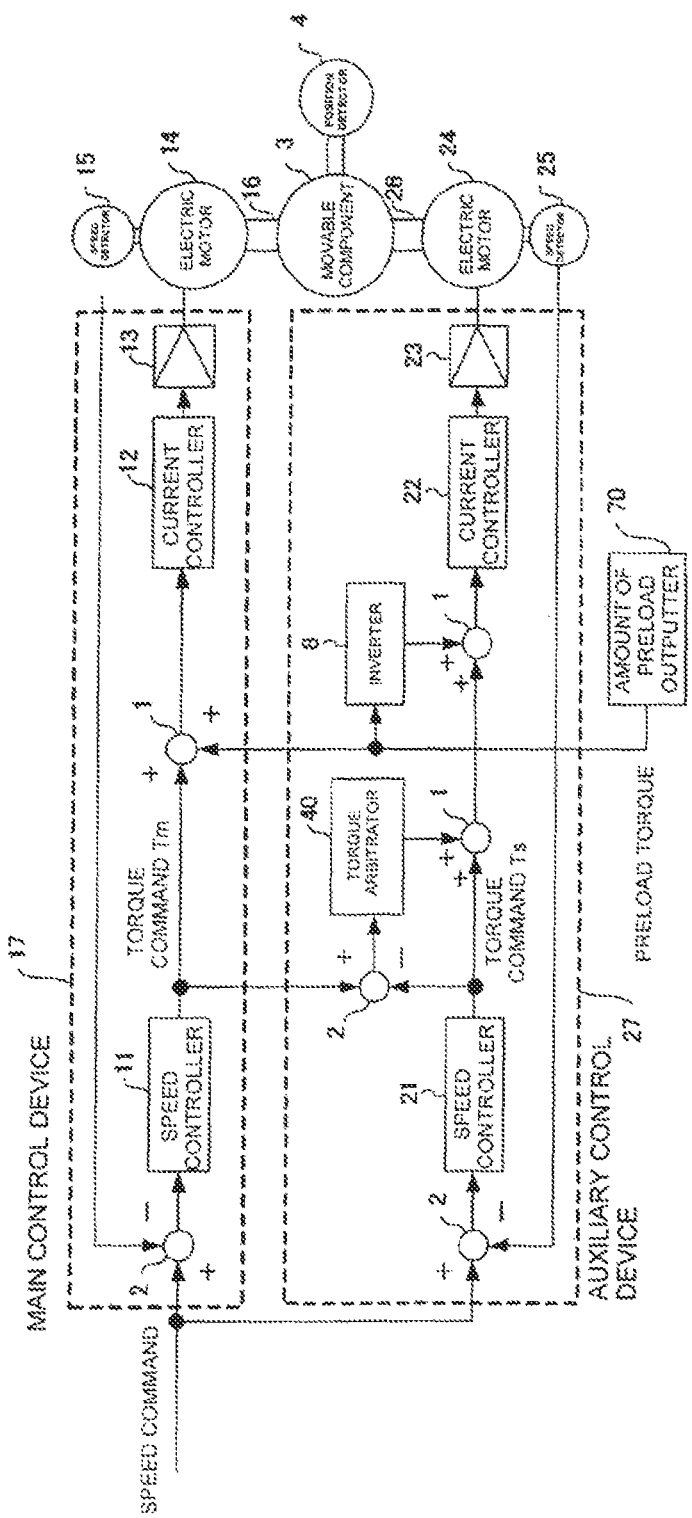
FIG. 7 is a block diagram illustrating main components for related art tandem control to which a preload torque is applied.

FIG. 2B illustrates applying preloads having different polarities to the main electric motor and the auxiliary electric motor, so that the backlash can be minimized. In the related art illustrated in FIG. 7, and in the present invention illustrated in FIG. 1, backlash is minimized by adding preload torques having different polarities to the torque commands Tm and Ts.

Figure 3:
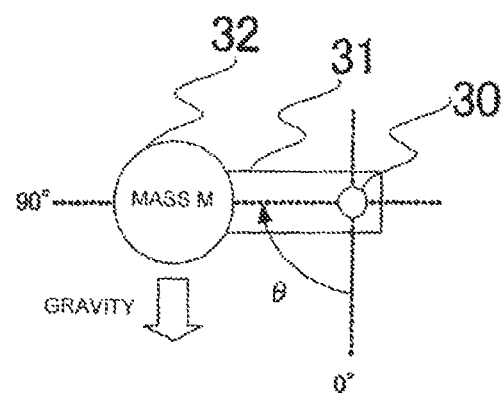
FIG. 3 illustrates a shaft that is under the influence of gravity, to which the present invention is applied.

FIG. 3 illustrates a shaft that is under the influence of gravity, to which the present invention is applied. FIG. 3 schematically illustrates operation of a trunnion structure for use in, for example, a machine tool. A trunnion structure drives an object 32 through an arm 31 by applying power to a center 30 of a rotating shaft. The influence of gravity in the shaft driving direction varies depending on the rotation angle, and a holding torque for canceling the influence of gravity is applied. When it is assumed that the position at which the influence of gravity in the shaft driving direction is minimum is at 0 degrees, the holding torque is represented by the expression M×g×sin θ, where M represents the mass of the object 32, g represents gravitational acceleration, and θ represents the rotation angle.

When the trunnion structure is driven and controlled by the tandem control electric motor control device that uses gears as power transmission mechanisms, applying a preload torque for minimizing backlash increases the amount of heat generation because a torque command for an electric motor includes the holding torque and the preload torque. As a result, an overload alarm for protecting the electric motor may be generated. Additionally, because preload torques having different polarities are applied to the main electric motor and the auxiliary electric motor, heat generated from the electric motors may be unbalanced, causing a driving shaft to run out of alignment. Therefore, in order to minimize both heat generation from electric motors and backlash in a mechanism that is under the influence of gravity, it is necessary to control a preload torque that is to be applied such that a sum of the holding torque and a preload torque that is to be applied is adjusted to be equal to a minimum necessary torque for eliminating backlash. When a trunnion structure is taken as an example, it is desirable for the preload torque to be a value obtained by subtracting M×g×sin θ from To, where θ represents the rotation angle, and To represents the preload torque applied at the angle of 0 degrees. Here, when it is assumed that the holding torque applied at the angle of θ is Kθ, because the equation Kθ=M×g×sin θ holds, the preload torque to be applied at the angle of θ, Tθ, is determined by the equation Tθ=To−Kθ, and it can also be considered that it is desirable for a sum of the preload torque Tθ and the holding torque Kθ to be maintained equal to a constant value, To.

Figure 5:
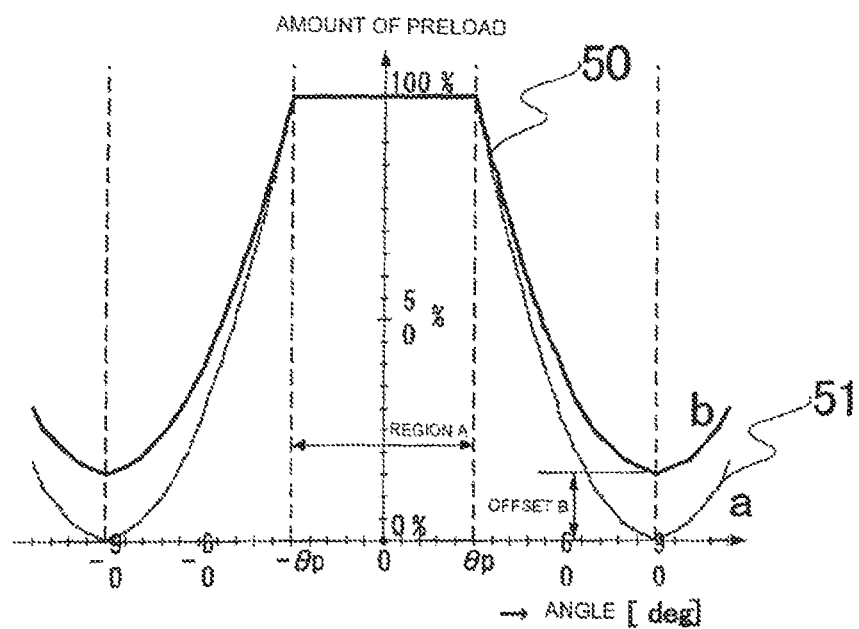
FIG. 5 illustrates an example of functions for calculating a preload variable amount that is to be applied to a mechanism that is under the influence of gravity, which is calculated by an amount of preload calculator 6 shown in FIG. 1.

FIG. 5 illustrates an example of functions for calculating a preload variable amount that is to be applied to a mechanism that is under the influence of gravity, which is calculated by the preload controller 10 shown in FIG. 1. The functions shown in FIG. 5 represent a variable coefficient K (K≤1) by which the preload torque is multiplied. The variable coefficient K is 1 in a region A, a range between (−θp) and θp, and varies in ranges outside the region A to form a sinusoidal wave in which the variable coefficient K is minimum at the position where θ=90 degrees. The variable coefficient K is represented by the following equations 1:

$$K=1\ ((-\theta p)<\theta<\theta p)$$

$$K=1-\alpha \times \sin \theta a\ ((-90)\leq\theta<(-\theta p),\ \text{and}\ \theta p\leq\theta\leq 90)$$

where $\theta a=(\theta-\theta p)\times 90/(90-\theta p)$

Here, θ represents the angle of the movable component, θp represents a constant preload range, and α represents a minimum value correction coefficient (0≤α≤1). Referring to FIG. 5, a function "a", 51, represents the variable coefficient K obtained by substituting α=1 in the equations 1, and a function "b", 50, represents the variable coefficient K obtained by substituting α≠1 in the equations 1.

In the function "a", 51, or the function "b", 50, shown in FIG. 5, the region A, the range of (−θp)<θ<θp, can be set in accordance with, for example, backlash or torsional moment in a power transmission mechanism. The above is effective in a mechanism that requires a large amount of preload torque because the influence of gravity is small near the angle of 0 degrees. For example, in a mechanism that requires that the variable coefficient K≥0.5 at the angle of 0 degrees to near 45 degrees, θp may be set to be greater than or equal to 22.5 (θp≥22.5) based on the equations 1. Naturally, if, for example, backlash or torsional moment is not significant near the angle of 0 degrees, it is unnecessary to provide the region A. In the function "b", 50, an offset B (1−α) provided at the angle of 90 degrees can be set in accordance with, for example, backlash or torsional moment near the angle of 90 degrees. The above is effective in a mechanism in which backlash cannot be sufficiently minimized only by the holding torque near the angle of 90 degrees. For example, in a mechanism in which the holding torque applied at the angle of 90 degrees is 0.7 times the preload torque necessary for eliminating backlash, α may be set to be equal to 0.3 (α=0.3). Naturally, if backlash can be eliminated only by the holding torque near the angle of 90 degrees, it is unnecessary to provide the offset B.

By calculating a preload torque using the function "a", 51, or the function "b", 50, a sum of the holding torque and a preload torque that is to be applied is adjusted to be equal to a minimum necessary torque for eliminating backlash, and it is possible to both minimize heat generation from electric motors, and eliminate backlash.

Although not described in the foregoing description, the preload controller 10 may be implemented by calculation performed in one of a host control device, the main control device, or the auxiliary control device. Further, although it has been described that a preload variable amount is calculated using position feedback information from a position detector, a preload variable amount may be calculated from a position command in a host control device.

What is claimed is:

1. An electric motor control device for performing tandem control for driving a movable component for which an amount of load caused by gravity varies in accordance with a position of the movable component, using a main electric motor and an auxiliary electric motor, the electric motor control device comprising, for each of the electric motors:
    a position controller configured to calculate a speed command for a corresponding electric motor based on a common position command and to control the position of a movable component for which an amount of load caused by gravity varies in accordance with a position of the movable component;
    a speed controller configured to calculate a torque command for the corresponding electric motor based on the speed command calculated by the position controller;
    a preload controller configured to apply a preload torque to the torque command calculated by the speed controller, the preload torque having opposite polarities for the main electric motor and the auxiliary electric motor; and
    a current controller configured to calculate a current command for the corresponding electric motor based on the torque command,
    wherein the preload controller is configured to vary the preload torque based on the position of the movable component.

2. The electric motor control device according to claim 1, wherein
    the preload controller applies an amount of preload torque obtained by multiplying a predetermined reference torque by a coefficient that varies with the position of the movable component, and
    the coefficient is constant in a constant coefficient range that is symmetric with respect to a given point of origin, and decreases with distance from the point of origin outside the constant coefficient range.

3. The electric motor control device according to claim 2, wherein
    a sum of the preload torque that is to be applied and a holding torque for holding the movable component at a command position, the holding torque varying with the position of the movable component, is maintained constant irrespective of the position of the movable component.

4. An electric motor control device for performing tandem control for driving a movable component using a main electric motor and an auxiliary electric motor, the electric motor control device comprising, for each of the electric motors:
    a position controller for calculating a speed command for a corresponding electric motor based on a common position command for controlling a position of the movable component;
    a speed controller for calculating a torque command for the corresponding electric motor based on the speed command calculated by the position controller;
    a preload controller for applying a preload torque to the torque command calculated by the speed controller, the preload torque having opposite polarities for the main electric motor and the auxiliary electric motor;
    a current controller for calculating a current command for the corresponding electric motor based on the torque command; and
    a torque arbitrator configured to calculate a torque arbitration value for performing arbitration on a difference between the torque command calculated by the speed controller for the main electric motor and the torque command calculated by the speed controller for the auxiliary electric motor in accordance with at least a time that has elapsed from application or removal of the preload torque, and adding the torque arbitration value to the torque command before the torque command is input to the current controller for the auxiliary electric motor.

5. The electric motor control device according to claim 4, wherein
    the torque arbitrator is configured to output zero as the torque arbitration value until said time that has elapsed from application or removal of the preload torque reaches a predetermined reference period of time, and to output a torque arbitration value obtained by performing low-pass filtering on the difference between the torque command calculated by the speed controller for the main electric motor and the torque command calculated by the speed controller for the auxiliary electric motor when said time that has elapsed from application or removal of the preload torque exceeds the predetermined reference period of time.

\* \* \* \* \*